(12) United States Patent
Braford, Jr.

(10) Patent No.: US 8,313,406 B2
(45) Date of Patent: Nov. 20, 2012

(54) DUAL CLUTCH TRANSMISSION

(75) Inventor: Thomas E. Braford, Jr., Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 441 days.

(21) Appl. No.: 12/450,486

(22) PCT Filed: Apr. 2, 2008

(86) PCT No.: PCT/US2008/004288
§ 371 (c)(1),
(2), (4) Date: Sep. 28, 2009

(87) PCT Pub. No.: WO2008/124001
PCT Pub. Date: Oct. 16, 2008

(65) Prior Publication Data
US 2010/0016115 A1    Jan. 21, 2010

Related U.S. Application Data

(60) Provisional application No. 60/922,286, filed on Apr. 6, 2007.

(51) Int. Cl.
*F16H 37/02*    (2006.01)
(52) U.S. Cl. ...................................................... 475/218
(58) Field of Classification Search ................ 74/665 G, 74/330, 331; 475/207, 218, 302, 303, 323, 475/343
See application file for complete search history.

(56) References Cited

U.S. PATENT DOCUMENTS

| | | | |
|---|---|---|---|
| 4,615,240 A * | 10/1986 | Weiss | 475/205 |
| 5,385,064 A | 1/1995 | Reece | |
| 5,577,973 A * | 11/1996 | Schmidt | 475/5 |
| 5,711,409 A | 1/1998 | Murata | |
| 6,506,139 B2 | 1/2003 | Hirt et al. | |
| 6,887,184 B2 | 5/2005 | Buchanan et al. | |
| 6,909,955 B2 | 6/2005 | Vukovich et al. | |
| 6,966,989 B2 | 11/2005 | Hojsgaard et al. | |
| 6,969,335 B2 * | 11/2005 | Lorken | 475/302 |
| 7,083,540 B2 * | 8/2006 | Janson et al. | 475/211 |
| 7,175,563 B2 | 2/2007 | Baldwin | |
| 7,611,433 B2 * | 11/2009 | Forsyth | 475/5 |
| 2006/0032321 A1 * | 2/2006 | Aitzetmueller et al. | 74/330 |

(Continued)

FOREIGN PATENT DOCUMENTS

DE    36 21 545 A1    1/1988

*Primary Examiner* — Ha D. Ho
*Assistant Examiner* — Jude Agendia
(74) *Attorney, Agent, or Firm* — Warn Partners, P.C.

(57) ABSTRACT

A dual clutch transmission 17 for an automotive vehicle is provided, including a dual clutch assembly 216 for selective torsional connection with geared first and second shafts 214, 218 rotatable about a first axis. A third geared shaft 230 having at least one gear 226 for meshed engagement with at least one gear 210 of said first and second geared shafts. A plurality of synchronizers 228, 232 for selectively determining torsional transfer between at least one of said first and second geared shafts 214, 218 and said third shaft 230. At least one synchronized gear 226 can be acted upon by a first synchronizer 228 for direct connection to one of said shafts 230 and said one synchronized gear 226 can be connected to one of said shafts 230 by a planetary gear set 234, 236, 237 to provide a second gear ratio for said transmission 17.

1 Claim, 6 Drawing Sheets

U.S. PATENT DOCUMENTS

| | | |
|---|---|---|
| 2006/0048594 A1 | 3/2006 | Gumpoltsberger et al. |
| 2006/0101933 A1 | 5/2006 | Koenig et al. |
| 2006/0207655 A1 | 9/2006 | Xiang et al. |
| 2006/0225527 A1* | 10/2006 | Yang et al. ............... 74/330 |
| 2007/0121046 A1* | 5/2007 | Toko ............... 349/127 |
| 2007/0131046 A1* | 6/2007 | Borgerson ............... 74/331 |

* cited by examiner

DUAL CLUTCH TRANSMISSION

This application is a National Stage of International Application No. PCT/US2008/004288, filed Apr. 2, 2008. This application claims priority to Provisional Patent Application No. 60/922,286 filed on Apr. 6, 2007. The disclosure of the above applications are incorporated herein by reference.

FIELD OF THE INVENTION

The present invention relates to dual clutch transmissions for automotive vehicles.

BACKGROUND OF THE INVENTION

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first and oldest type is the manually operated transmission. These transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever, and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. A type of combination type transmission is commonly referred to as a dual clutch transmission.

Examples of dual shift transmissions and control methods can be found by a review of U.S. patents and patent application Publications U.S. Pat. Nos. 5,711,409; 6,966,989; 6,887,184; 6,909,955; 2006/0101933A1; and 2006/0207655A1.

SUMMARY OF THE INVENTION

The present invention is an alternative to dual clutch transmissions noted above and others previously revealed. The dual clutch transmission of the present invention has a dual clutch assembly for selective torsional connection with geared first and second shafts rotatable about a first axis, a third gear shaft having at least one gear for meshed engagement with at least one geared of the first and second shafts, a plurality of synchronizers for selectively determining torsional transfer between at least one of the first and second shafts and the third shaft and at least one synchronized gear can be acted upon by a first synchronizer for direct connection to one of the shafts and the one synchronized gear be connected to one of the shafts by a planetary gear set to provide a second gear ratio for the transmission.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a schematic view of a front wheel drive transmission of the present invention.

DETAILED DESCRIPTION OF THE DRAWINGS

Figure 1:
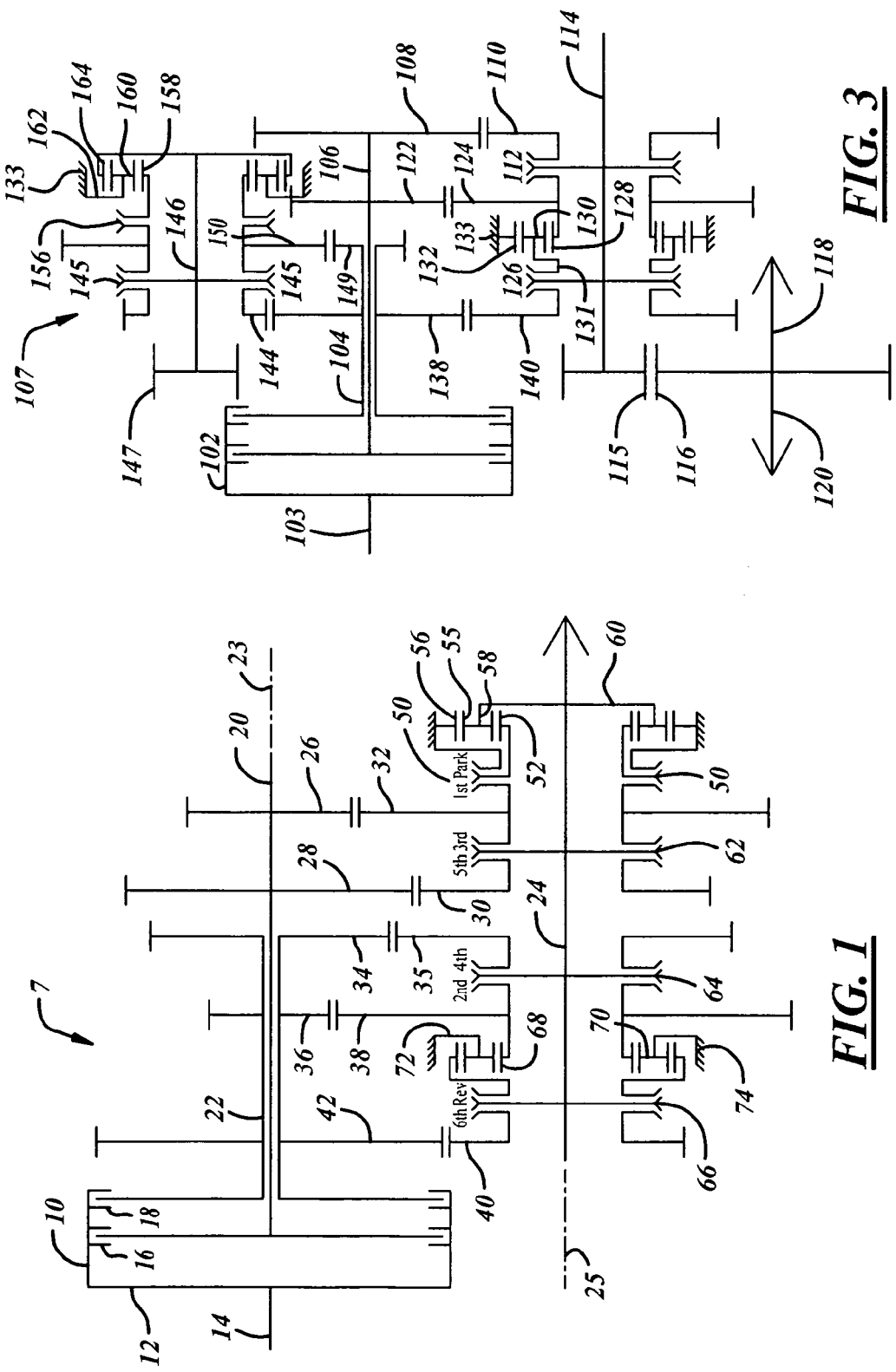
FIG. 1 is a schematic view of a rear wheel drive transmission of the present invention.

Referring to FIG. 1, a dual clutch transmission 7 of the present invention is brought forth. A dual clutch transmission 7 has a dual clutch assembly 10. The dual clutch assembly 10 may be of several configurations. An example of such a dual clutch assembly can be found in a review of U.S. patent application Ser. No. 11/703,425 or other suitable configurations. Dual clutch assembly 10 has a housing 12 with a geared clutch input shaft 14. Input shaft 14 is typically connected with the output shaft of a power source such a car engine (not shown) optionally via a damper (not shown). The clutch housing 12 mounts first and second clutch packs 16, 18 that can be independently selectably engaged to torsionally connect the clutch housing 12 with a first or inner transmission geared input shaft 20 and a second or outer transmission shaft 22 rotatable about an axis 23. A controller (not shown) controls the engagement of the clutch packs 16,18. As used in this application, the term gear relates to the gears connected to the transmission input shafts 22 or 20, or the transmission output shaft 24 (also referred to as a lay shaft), in some instances the term gear may refer rather to sprockets engaged with chains or drums engaged with belts. However, in most instances, the term gear refers to actual gears.

The first transmission input shaft 20 has connected thereto input gears 26 and 28. Input gears 26 and 28 in cooperation with ratio defining gears 32, 30 which rotate on a second rotational axis 25 about output shaft 24, provide the odd transmission number gear ratios for first, third, and fifth gear. Input gear 28 meshes with output gear 30 to provide a fifth gear for the transmission 7. Input gear 26 meshes with output gear 32 to provide either third gear or first gear. Input gear 34 which is connected with the second input shaft 22, meshes with output gear 35 to provide a fourth gear for the transmission 7. Input gear 36, connected with the second input shaft 22 and meshed with a ratio defining output gear 38, provides a second gear for the transmission 7. Ratio defining output gear 38 also provides reverse gear in a manner to be later described. Ratio defining output gear 40 meshes with input gear 42 to provide a sixth gear to the transmission 7. To operate in first gear of transmission 7, the clutch 10 will cause friction pack 16 to engage the first input shaft 20, thereby rotating the input gear 26. Input gear 26 meshes with output gear 32. Gear 32 is engaged by a dual acting synchronizer 50, which is located on the rotational axis of the output shaft 24. When activated to the left, synchronizer 50 connects gear 32 with a sun gear 52 to determine the torsional transfer between the shafts 20 and 24. The sun gear 52 is part of a planetary gear set having a carrier gear 54 and a grounded ring gear 56. The carrier gear 54 rotates about a shaft 58 which is connected with a carrier arm 60. The planetary gear set provided by the sun gear 52, carrier 54, and stationary ring gear 56 provide a first gear output for the transmission 7, while at the same time reducing the needed space between the axis of the first input shaft 20 and the output shaft 24. To provide a parking function for the transmission 7, the synchronizer 50 is shifted to the right. To operate the parking gear, the synchronizer 50 will engage the ring gear 52 to be grounded; causing the carrier 58 to be froze in position.

To run the transmission 7 in third gear, a synchronizer 62 will directly connect the output shaft 24 with the output gear 32. To operate in the fifth gear, the transmission 7 first input shaft 20 will rotate input gear 28 to mesh with output gear 30. Synchronizer 64 can be actuated to the right to place the transmission 7 in fourth gear, thereby directly connecting the gear 35 with the input gear 34. To operate in the second gear, the synchronizer 64 is actuated to the left, connecting the output gear 38 with the output shaft 24. To operate in reverse, the synchronizer 66 is actuated to the right, connecting the input gear 38 via its connected sun gear 68 with a planetary gear set which meshes with carrier gears 70, which have a fixed carrier 72. Carrier gears 70 in turn mesh with a ring gear 74. To operate the transmission 7 in the sixth gear, the synchronizer 66 is actuated to the left, thereby connecting gear 40 with the output shaft 24.

Figure 2:
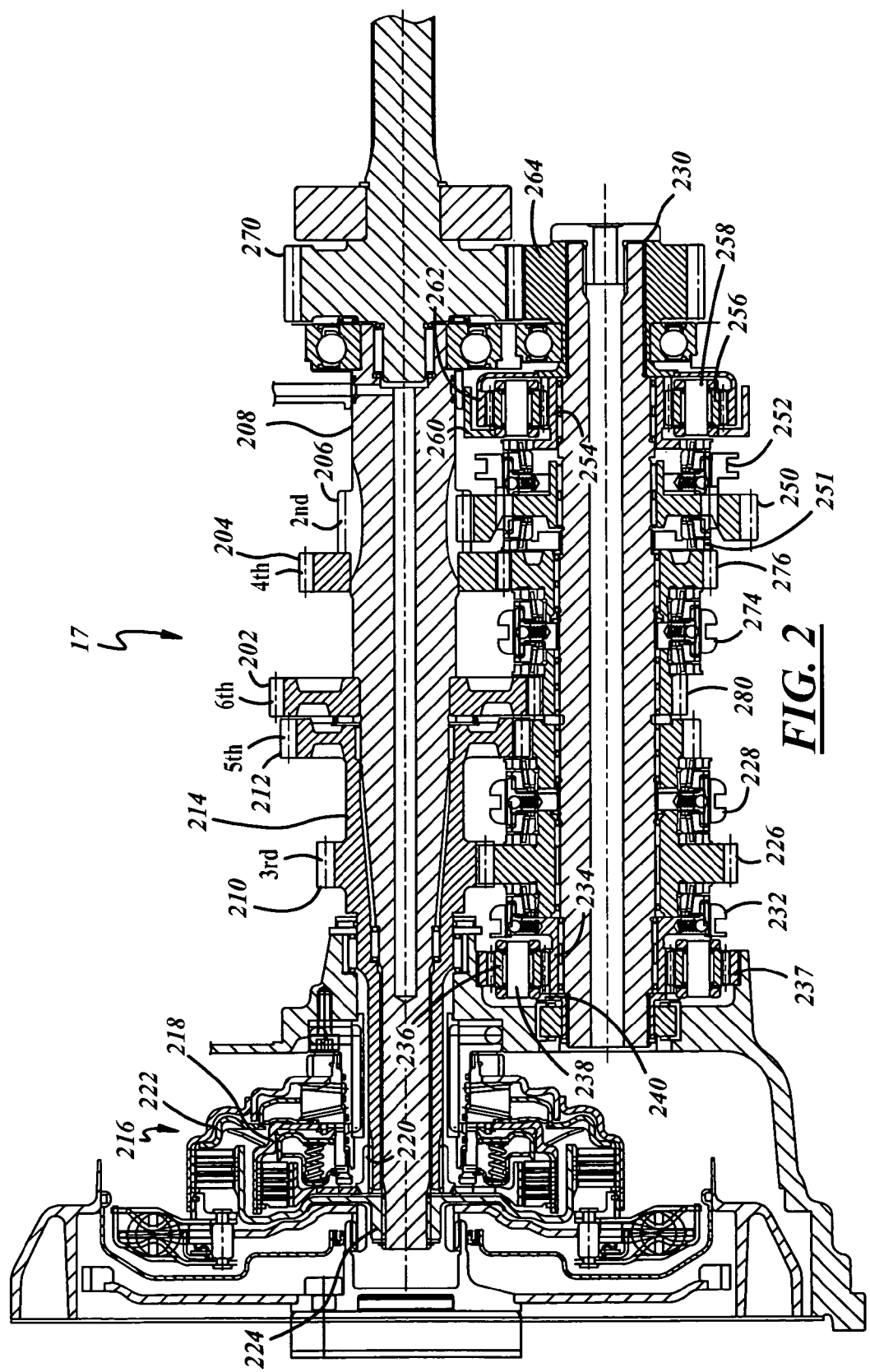
FIG. 2 is a sectional view of another embodiment of a rear wheel drive transmission embodiment of the present invention.

FIG. 2 is a sectional view of a transmission 17 of the present invention. Transmission 17 is similar to transmission 7 except that the sixth 202, fourth 204 and second 206 input gears have been relocated to the inner input shaft 208 and the third 210 and fifth 212 input gears have been relocated to the outer input shaft 214. The transmission 17 has a clutch assembly 216 having a clutch housing 218 joined by a friction pack to a hub 220 which is in turn torsionally connected with the outer input shaft 214. The clutch assembly 216 also has a housing 222 that is joined by a clutch path to a hub 224 which is torsionally connected with the shaft 208. The third input gear 210 is meshed with a third output gear 226. Synchronizer 228 is provided to connect the third input gear 226 with an output shaft 230. Synchronizer 232 connects the third output gear 226 with the shaft 230 via a planetary gear set provided by sun gear 234, planet gears 236 and fixed or grounded ring gear 237. The planet gears 236 rotate on shafts 238 which are joined to carriers 240 which are connected with the shaft 230 to provide the first gear ratio. Synchronizer 252, as shown, is a dual acting synchronizer. As defined in the present application, synchronizer 252 is a plurality of synchronizers due to its dual action with regard to second input gear 250. When actuated to the left, synchronizer 252 joins second input gear 250 directly to the shaft 230 via portion 251 to provide the second gear ratio. The reverse gear function is provided by the second input gear 250 being connected by synchronizer 252 with sun gear 254 by moving synchronizer 252 to the right. Sun gear 254 is in mesh with planet gears 256 which rotate on shaft 258 which are connected with a grounded carrier 260. The planetary gear set has a ring gear 262 which is fixably connected with gear 264 which is affixed upon shaft 230. Gear 264 is meshed with gear 270 which provides the output of the transmission 17. Gear 270 is rotatably mounted within a cut-out of shaft 208. Synchronizer 274 is provided to selectively join output gear 276 with input gear 204 for fourth gear or to join output gear 280 with input gear 206 to provide the sixth gear of operation.

Figure 4:
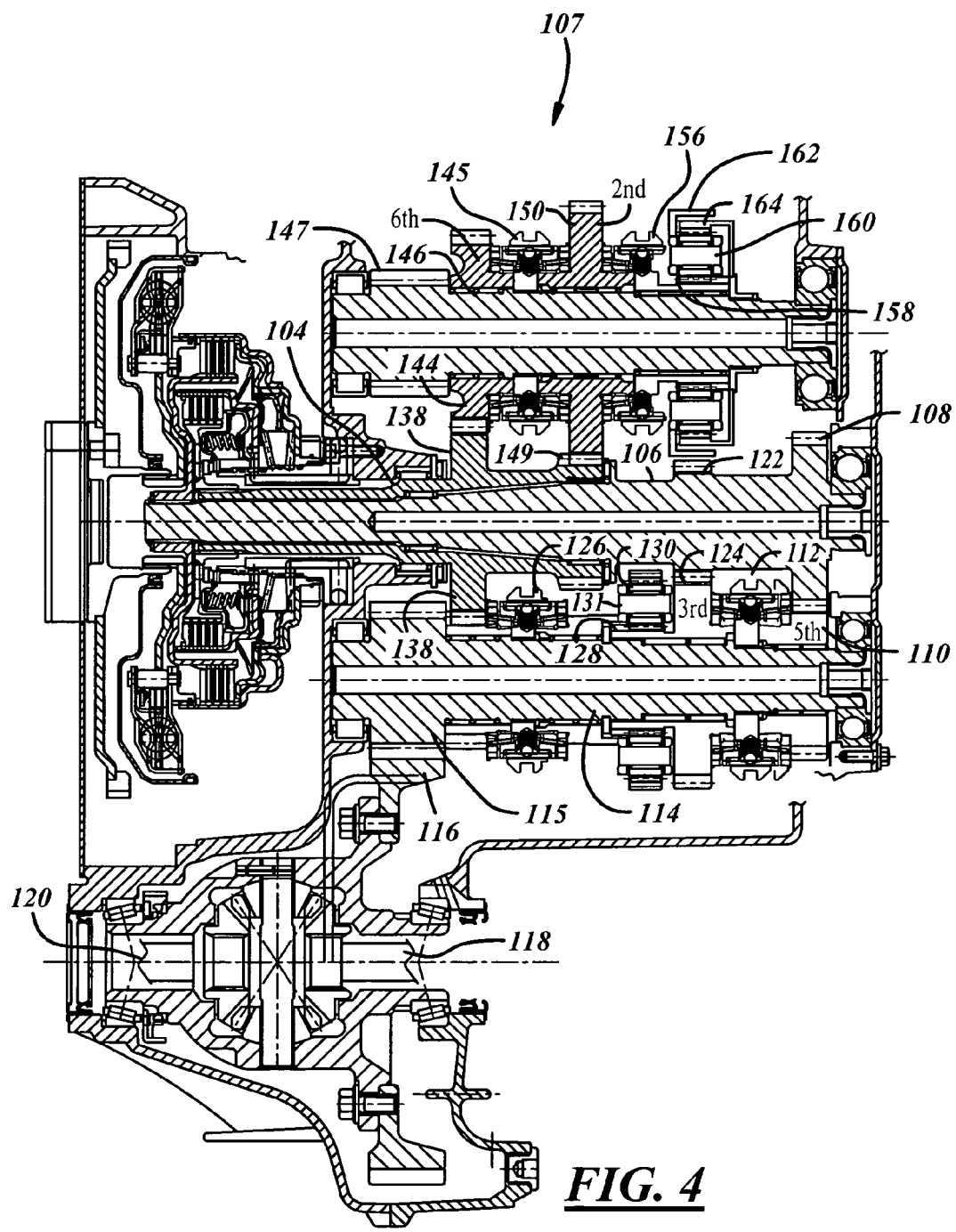
FIG. 4 is a sectional view of the front wheel transmission of the present invention shown in of FIG. 3.

FIGS. 3 and 4 reveal a front wheel drive version transmission 107 of the present invention. The transmission 107 has a dual clutch assembly 102 having an input shaft 103. The dual clutch assembly 102 can selectively power a geared inner transmission input shaft 106 or an outer transmission input shaft 104. The inner transmission input shaft 106 is connected with an input gear 108 which meshes with a ratio defining output gear 110. Output gear 110 can be torsionally affixed with a first output shaft 114 by a synchronizer 112 being actuated to the right, placing the transmission 107 in the fifth gear ratio. When in the fifth gear ratio, the second output shaft 114 turns an output gear 115 that meshes with the differential input gear 116 that in turn rotates output shafts 120,118 of the front wheel differentials. The first transmission input shaft 106 is also fixably or torsionally affixed to the output gear 122, which meshes with an input gear 124. If synchronizer 112 is actuated on the left, synchronizer 112 will directly affix the input gear 124 with the output shaft 114, causing the transmission 107 to operate in its third gear. If synchronizer 112 is in a neutral state and synchronizer 126 is actuated to the right, synchronizer 126 will connect the input gear 124 with the output shaft 114 via a planetary gear set which includes a sun gear 128 which is affixed with the input gear 124, a carrier gear 130 having carriers 131, which is actuated by the synchronizer 126, and a stationary ring gear 132 that is grounded to a casing 133 of the transmission. The above noted action will place the transmission 7 in the first gear ratio. An input gear 138 which is torsionally affixed with the outer input shaft 104 is in mesh with an output gear 140. Output gear 140 can be torsionally connected with the output shaft 114 by actuating the synchronizer 126 to the left position to place the transmission 107 in fourth gear. The outer input shaft 104 is also torsionally affixed with input gear 149. The output gear 138 is also meshed with an input gear 144 to provide the sixth gear ratio of the transmission 107. To activate the input gear 144 to be torsionally joined with the second output shaft 146, a synchronizer 145 is actuated to the left as shown in the drawing FIG. 3. This places the transmission 107 in sixth gear. To place the transmission 107 in the second gear ratio, an input gear 149, which is connected with the input shaft 104, is meshed with an output gear 150. The output gear 150 is actuated by the synchronizer 145 moving to the right, thereby directly connecting the output gear 150 with the second output shaft 146. To place the transmission in reverse, the synchronizer 156 is actuated to the right, connecting the input gear 150 with a sun gear 158. The sun gear 158 being in a planetary set with carrier gears 160 and ring gear 164.

A carrier 162 is grounded to the casing 133. A gear 147 is torsionally affixed with the second output shaft 146 and rotates in a third plane which is non-co planer with a plane intersecting the rotational axis of the first output shaft 114 and the input shaft 106. The gear 147 also meshes with the differential input gear 116, allowing power from the second output shaft 146 to flow to the differential output shafts 120, 118. It should be noted that the first output shaft 114 includes ratio defining gears for the even (fourth) and odd gears (first, third, fifth) of the transmission 107.

Figure 5A:
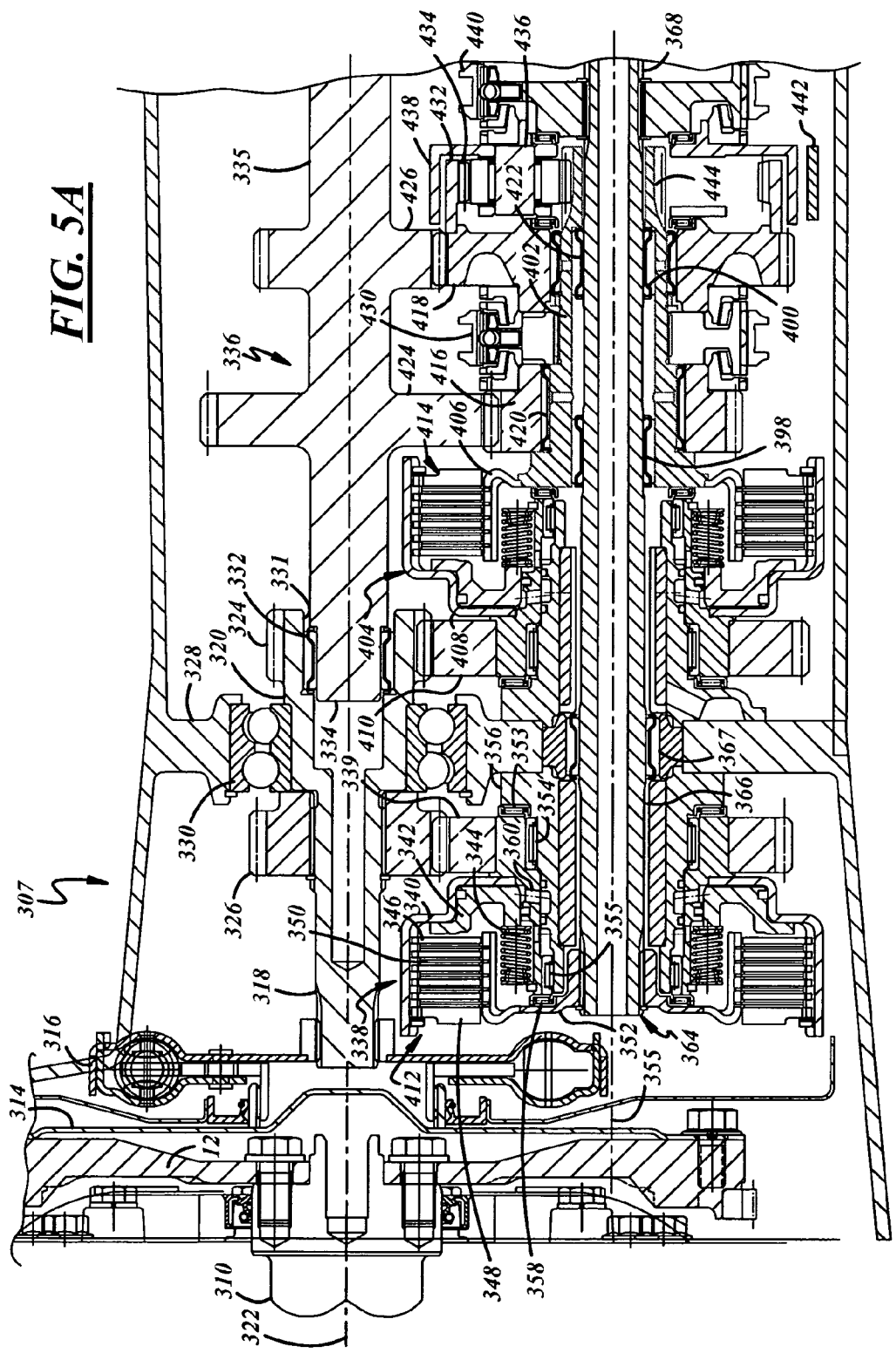
FIGS. 5A and 5B are sectional views of an alternative embodiment of a rear wheel drive transmission of the present invention.
Figure 5B:
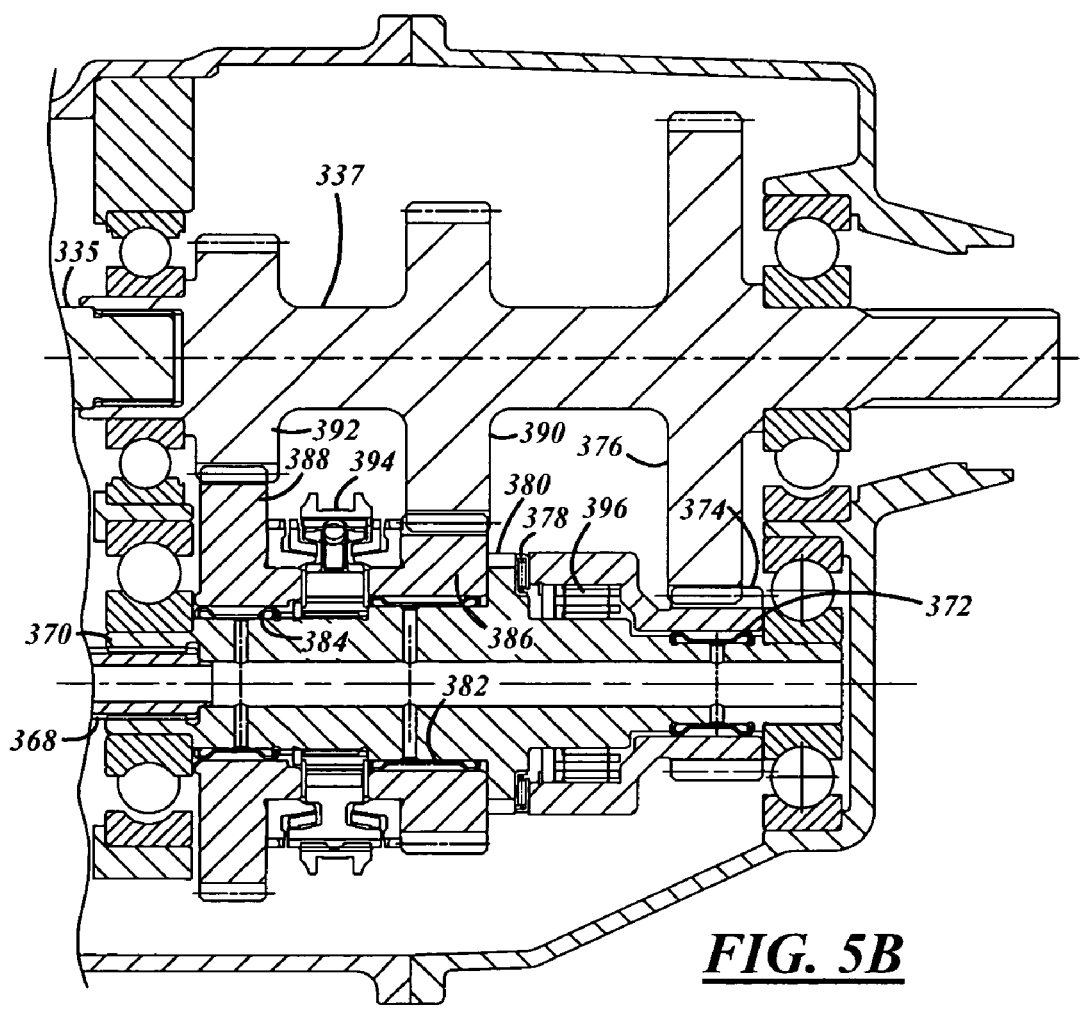

Referring of FIGS. 5A and 5B, an engine output shaft 310 is bolt connected to a flywheel 312. The flywheel 312 has a bolt connected plate 314 with a spline connection with a damper 316. The damper 316 provides an input to a dual clutch transmission 307 of the present invention. The damper 316 has a spline connection with a stem portion 318 of an input gear housing 320. The input gear housing 320 rotates about a first axis 322. The gear housing 320 is integrally formed with a second input gear 324. Torsionally affixed with the input gear housing 320 is a first input gear 326. The gear housing 320 is rotatably mounted with a frame 328 of transmission 307 by a bearing 330. The bearing 330 is positioned between the input gears 324 and 326. The gear housing 320 has an opening 331 that rotatably mounts via a bearing 332 a front end 334 of a multiple-piece output shaft 336 having a front portion 335 and a rear portion 337.

The first input gear 326 is torsionally associated by a meshing gear connection with a first clutch 338. The clutch 338 has a gear 339 connected with a clutch housing 340. The clutch housing 340 mounts a piston 342 that is biased to a non-engaged position by a spring 344. The clutch housing 340 also has a spline connection with a series of pressure plates 346 and an end plate 348. The pressure plates 346 are juxtaposed by a series of friction plates 350. The friction plates 350 are torsionally connected by a spline connection with a hub 352.

The clutch 338 is rotatably mounted to the frame 328 by bearings 353, 354 and 355 that rotate on a clutch support 356 that is generally fixed with the frame 328. A bearing 358 separates the hub 352 from clutch housing 340. The clutch housing 340 has a clutch pressurization inlet 360 for activation of the piston 342.

The hub 352 is splined to a multiple-piece first input shaft 364 having a front portion 366. The first input shaft 364 rotates along second axis 365 that is parallel with the first axis 322. A bearing 367 mounted to the frame 328 mounts the front portion 366. The input shaft front portion 366 has a male splined rear end 368 which is splined to a first input shaft rear portion 370. Mounted on the rear portion 370 by a bearing 372 is a gear ratio defining first gear pinion 374. The pinion 374 meshes with an output shaft gear 376. A thrust bearing 378 separates the pinion 374 from a flange 380 of the rear portion 370. Rotatably mounted on the rear portion 370 by bearings 382 and 384 are third and fifth gears 386 and 388. Bearing 372, 382 and 384 are lubricated via oil passages that intersect an axial extending interior bore of the first input shaft 364.

The third gear 386 meshes with the output shaft gear 390. The fifth gear 88 meshes with the output shaft gear 392. The odd gear ratios of the gears on the first input shaft 364 increase in a forward direction.

A two-way synchronizer 394 can be selectively actuated to connect the third gear 386 or the fifth gear 388 with the first input shaft 364. The synchronizer 394 can be hydraulic synchronizer or a mechanical split fork synchronizer as shown. The first pinion 374 can be connected with the first input shaft by a synchronizer or by a one-way clutch 396. The one-way clutch 96 can be on the input side of the pinion 374 (left side in FIG. 1) thereby reducing, the maximum torque requirements of the one-way clutch 396.

Concentrically mounted by bearings 398 and 400 on the first input shaft 364 is a second input shaft 402. The second input shaft 402, by a hub 406, is torsionally connected with a second clutch 404. The second clutch 104 is identical or substantially similar in design and function with the clutch 338. The second clutch 404 has a housing 408 fixedly connected with a gear 410 that is in mesh with the second input gear 324. The friction packs 412 and 414 of the first and second clutches are outboard of the input gears 326 and 324. The second and forth gears 416 and 418 are mounted on the second input shaft 402 by bearings 420 and 422. The even engine gear ratios on the second input shaft 400 decrease forwardly. Second and forth gears 416 and 418 mesh with gears 424 and 426 of the output shaft 336. Synchronizer 430 can selectively connect the second gear 416 or the forth gear 418 with the second input shaft 402.

The gear 418 is connected with a ring gear 432. Ring gear 432 is in mesh with planet gears 434 (only one gear 434 shown). The planet gears 434 are mounted on a carrier 436. The carrier 436 has fixably connected thereto a drum 438. The first input shaft forward portion splined end 368 mounts a torsionally fixed synchronizer 440. A band brake 442 or a clutch (not shown) is provided to selectively ground the carrier 436 via the drum 438.

A geared end of the second input shaft provides a sun gear 444 for the planetary gear set. Grounding the drum 438 reverses the gear 418 thereby reversing the output shaft 336. Because the diameter of the input gear 326 is greater than the second input gear 324, the first input shaft 364 rotates faster than the second input shaft 402 (assuming full engagement of the first and second clutches 338 and 404). The synchronizer 440 can be actuated to overdrive the carrier 436. The sun gear 444 drives the planet gears on the carrier 434 causing a gear ratio increase in output of the ring gear 432 and forth gear 418. Accordingly, a six gear is realized.

Figure 6:
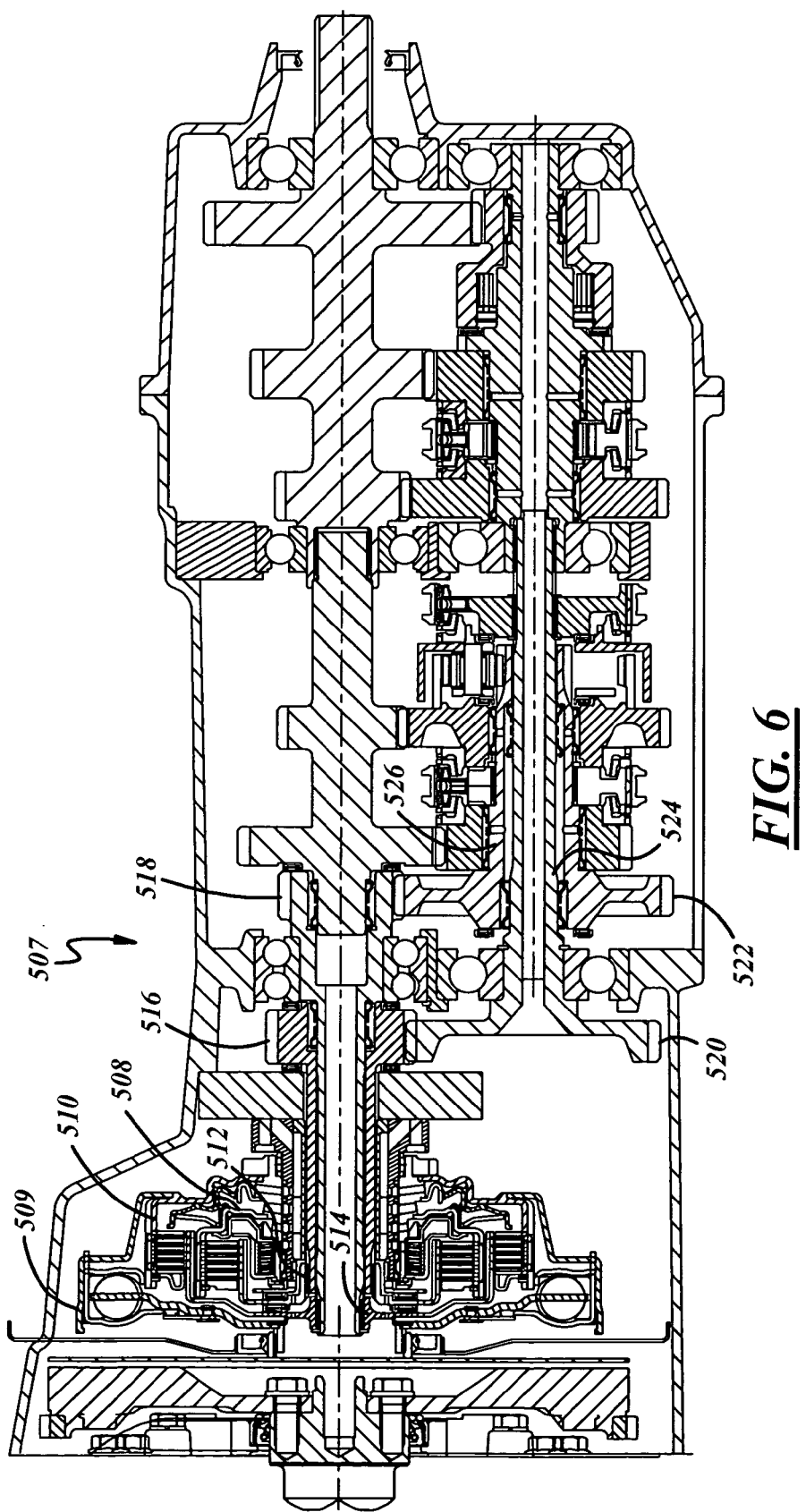
FIG. 6 is a sectional view of still another alternative embodiment of a rear wheel drive transmission of the present invention.

Referring to FIG. 6, a dual clutch transmission 507 is shown having co-axial first and second clutches 508, 510 torsionally connected with a damper 509 input to the transmission. The clutches 508, 510 have hubs 512, 514 with splined connections with first and second input gears 516, 518. The first and second input gears 516, and 518 are in mesh with gears 520 and 522 that are integral with the first and second input shafts 524 and 526. The remainder of the apparatus and function of the transmission 507 is substantially similar or identical to that previously explained for transmission 307. In FIG. 6, the clutch assembly (comprising clutches 508, 510) is torsionally connected to the first and second input shafts via input gears 516 and 518 unlike direct connection shown in transmission 307 of FIG. 5A.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

What is claimed is:

1. A dual clutch transmission for an automotive vehicle comprising:
    a dual clutch assembly rotatable about a first axis for selectively connecting first and second input gears with a power source;
    first and second concentric geared input shafts meshed with said first and second input gears respectively wherein one of said geared input shafts rotates at different speeds, each geared input shaft having a plurality of ratio defining gears rotatable about a second axis parallel with said first axis, said geared input shafts having at least one ratio defining gear rotatively mounted on said first geared input shaft and operatively associated with first and second synchronizers, said first synchronizer directly connecting said one ratio defining gear with said first geared input shaft for a first gear ratio and said second synchronizer connecting said one ratio defining gear with said second geared input shaft via a planetary gear set carrier and ring gear for a second gear ratio and said one ratio defining gear having a reverse gear ratio via a first geared input shaft sun gear portion when said carrier is grounded.

* * * * *